United States Patent
Yada

(10) Patent No.: US 6,490,304 B1
(45) Date of Patent: Dec. 3, 2002

(54) EXCIMER LASER DEVICE

(75) Inventor: Yuuji Yada, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/517,619

(22) Filed: Mar. 3, 2000

(30) Foreign Application Priority Data

| Mar. 5, 1999 | (JP) | 11-058600 |
| Mar. 26, 1999 | (JP) | 11-083298 |

(51) Int. Cl.[7] .............................................. H01S 3/22
(52) U.S. Cl. ................................................ 372/57
(58) Field of Search ........................ 372/55, 57, 58, 372/59

(56) References Cited

U.S. PATENT DOCUMENTS

| 4,891,818 A | * | 1/1990 | Levatter | 372/57 |
| 5,848,089 A | * | 12/1998 | Sarkar et al. | 372/58 |
| 6,018,537 A | * | 2/2000 | Hofmann et al. | 372/35 |
| 6,104,735 A | * | 8/2000 | Webb | 372/37 |

FOREIGN PATENT DOCUMENTS

| JP | 04105376 A | * | 5/1992 | 372/57 |
| JP | 10173259 A | * | 6/1998 | H01S/3/036 |

* cited by examiner

*Primary Examiner*—Paul Ip
*Assistant Examiner*—Jeffrey Zahn
(74) *Attorney, Agent, or Firm*—McDermott, Will & Emery

(57) ABSTRACT

When an excimer laser device is stopped from operating, an alternating current is applied to a coil of an electromagnet of a magnetic bearing for a fan so as to erase a residual magnetic field and thus weaken the adhesiveness of dust to the electromagnet. A dust sucking unit sucks to remove the dust attaching to the electromagnet together with a gas introduced into a chamber. In this way, accumulation of the dust on the magnetic bearing for the fan can be prevented.

8 Claims, 7 Drawing Sheets

TO POWER SUPPLY, CONTROL UNIT

EXCIMER LASER DEVICE

BACKGROUND OF THE INVENTION

1. Field of the Invention

The present invention relates to excimer laser devices, and particularly to an excimer laser device which excites laser gas in a chamber to produce a laser beam.

2. Description of the Background Art

FIG. 11 is a cross sectional view illustrating an entire structure of a conventional excimer laser device.

Referring to FIG. 11, a laser medium gas (hereinafter referred to as laser gas) containing halogen gas is enclosed in a laser chamber 81, and a predetermined high voltage is applied between discharge electrodes 82a and 82b to cause discharge and excite the laser gas so as to generate a laser beam. The laser beam thus generated is emitted to the outside of laser chamber 81 through windows 83 and 84 placed in the side walls in the direction of an optical axis. A fan 85 provided at a predetermined position in laser chamber 81 circulates the laser gas in laser chamber 81 to direct the laser gas to the location between discharge electrodes 82a and 82b.

A motor 87 for driving fan 85 to rotate it about an shaft of rotation 86 is located on the outside of laser chamber 81. Shaft of rotation 86 passes through the right and left side walls of laser chamber 81 and is rotatably supported by bearings 88 and 89 respectively.

There are further provided on the outside of laser chamber 81, a gas-dust separation unit 90 and a gas passage 91 for establishing communication between the inside of laser chamber 81 and the inside of gas-dust separation unit 90. The laser gas circulated by fan 85 is passed into gas-dust separation unit 90 through gas passage 91 so as to remove dust from the gas. Then, the gas cleaned through gas-dust separation unit 90 is returned into laser chamber 81 through a gas passage 92 formed in the side walls of laser chamber 81. At this time, the cleaned laser gas is partially returned through a labyrinth portion 93 located inside and near windows 83 and 84 into laser chamber 81, and the remaining gas is returned to fan 85 along gas passages 94 and 95, bearings 88 and 89 and shaft of rotation 86.

The conventional excimer laser device employs ball bearings as bearings 88 and 89 for fan 85. This device is accordingly disadvantageous in that impurity gas generated by reaction between the halogen gas in the laser gas and the lubricant for bearings, or the dust generated from the ball travelling surfaces of bearings 88 and 89 could deteriorate the laser gas and the resultant laser output could decrease. Further, bearings 88 and 89 themselves could wear due to the operation over a long period of time, requiring a regular maintenance.

In order to address this deficiency, the inventor of the present application has proposed a device which provides a non-contact support of rotational shaft 86 of fan 85 by magnetic bearings. This device allows rotational shaft 86 of fan 85 to be rotationally driven with no contact, so that the impurity gas and dust are never generated.

However, if any magnetic material is included in the dust generated during laser discharge or the like, the dust could adhere to and accumulate on a magnetic pole portion of an electromagnet of the magnetic bearing and accordingly, control of the magnetic bearing could be affected adversely.

A further problem of this device is increase in the size thereof due to the arrangement of rotational shaft 86 and magnetic bearings on both sides of fan 85.

SUMMARY OF THE INVENTION

One object of the present invention is to provide an excimer laser device capable of preventing accumulation of dust on a magnetic bearing of a laser gas circulation fan.

Another object of the invention is to provide an excimer laser device of a small size in which laser gas is never contaminated.

According to one aspect of the invention, a magnetic field erasing unit is provided for erasing a residual magnetic field by applying an alternating current to an electromagnet of the magnetic bearing when the excimer laser device is stopped. In this way, it is possible to weaken the adhesiveness of dust to the electromagnet and accordingly prevent the dust from accumulating on the electromagnet.

Preferably, a dust sucking unit is further provided for sucking and thus removing the dust adhering to the electromagnet of the magnetic bearing. In this way, the dust adhering to the electromagnet can easily be removed.

According to another aspect of the invention, the laser gas circulation fan is formed of a cylindrical member and vane members placed around the circumference of the cylindrical member, with a fixed shaft inserted into the cylindrical member. The fan is supported from the inside of the circumference of the cylindrical member with no contact by the magnetic bearing provided to the fixed shaft. The fan is driven to rotate by a driving unit with no contact. Accordingly, no impurity gas and no dust are generated from the bearing as they occur in the conventional device employing ball bearings or the like as the bearing, and the laser gas is never contaminated. Further, the device size can be made smaller compared with the conventional device having its shaft of rotation projecting from both sides of the fan.

Preferably, the magnetic bearing includes a radial displacement sensor for detecting the radial position of the fan and a radial electromagnet with its coil current controlled according to the result of detection by the radial displacement sensor. The magnetic bearing is thus constructed easily.

More preferably, the driving unit includes a rotor shaped into a ring along the inside of the circumference of the cylindrical member of the fan and a stator fixed onto the fixed shaft opposite to the rotor so as to generate a rotating magnetic field and thus drive the rotor to rotate with no contact. The driving unit is accordingly constructed easily.

Still preferably, a cable hole is made from the outer wall of the chamber toward the inside of the shaft of rotation, and a cable for the magnetic bearing and the stator is drown through the cable hole to the outside of the chamber. In this way, damage to the cable by the laser gas as well as contamination of the laser gas caused by impurity gas generated from the cable can be prevented.

Still more preferably, a metal cover is further provided for protecting the magnetic bearing and the stator. It is thus possible to protect the magnetic bearing from laser gas and noise and prevent generation of impurity gas from the stator.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
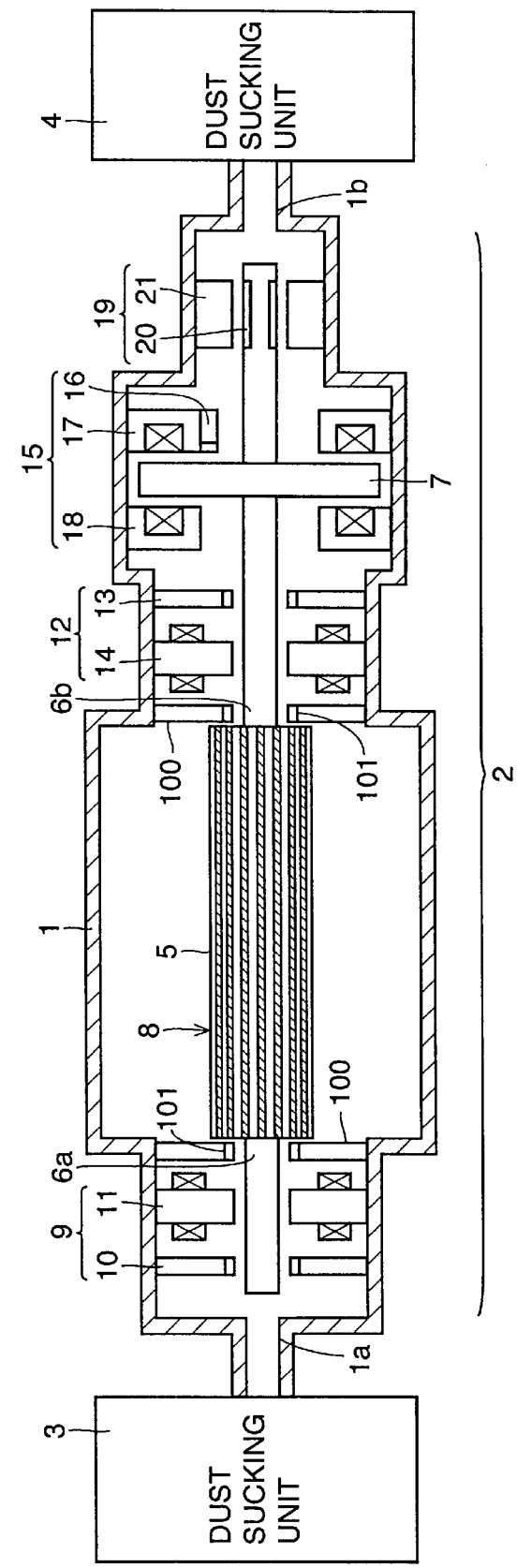
FIG. 1 is a cross sectional view illustrating a main portion of an excimer laser device in a first embodiment of the present invention.

FIG. 1 is a cross sectional view illustrating a main portion of an excimer laser device in the first embodiment of the invention.

Referring to FIG. 1, the excimer laser device includes a gas circulation fan unit 2 (fan for circulating gas) placed in a chamber 1 and dust sucking units 3 and 4 placed on the outer wall of chamber 1.

Gas circulation fan unit 2 includes a rotor 8 having a fan 5, main shafts 6a and 6b and a thrust plate 7, and further includes radial magnetic bearings 9 and 12, a thrust magnetic bearing 15 and a motor 19 for supporting rotor 8 with no contact and driving rotor 8 to rotate.

Fan 5 is formed into a cylindrical shape and main shafts 6a and 6b are respectively fixed to the surfaces on both ends of fan 5. Fan 5 and main shafts 6a and 6b are integrated to have the same central axis. When fan 5 is driven to rotate about the central axis, a plurality of vane members provided on fan 5 circulate gas within chamber 1. Main shaft 6a is inserted into and passed through radial magnetic bearing 9, and main shaft 6b is inserted into and passed through radial magnetic bearing 12, thrust plate 7 and thrust magnetic bearing 15. Circular thrust place 7 is fixed at the center of main shaft 6b perpendicularly thereto.

Radial magnetic bearing 9 includes a radial displacement sensor 10 and a radial electromagnet 11. Radial displacement sensor 10 is placed opposite to the circumferential surface of main shaft 6a to output a signal of a level according to the distance between a sensing portion of sensor 10 and the circumferential surface of main shaft 6a.

Figure 2:
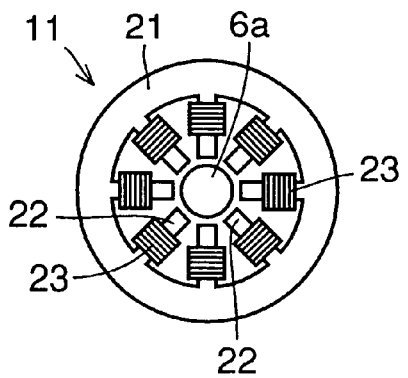
FIG. 2 illustrates a structure of a radial electromagnet shown in FIG. 1.

Referring to FIG. 2, radial electromagnet 11 includes a support member 21 having a ring shape, a plurality of (8 in FIG. 2) electromagnet cores 22 each projecting from the inner circumferential surface of support member 21 toward the outer circumferential surface of main shaft 6a, and a coil 23 wound around each core 22.

Figure 3:
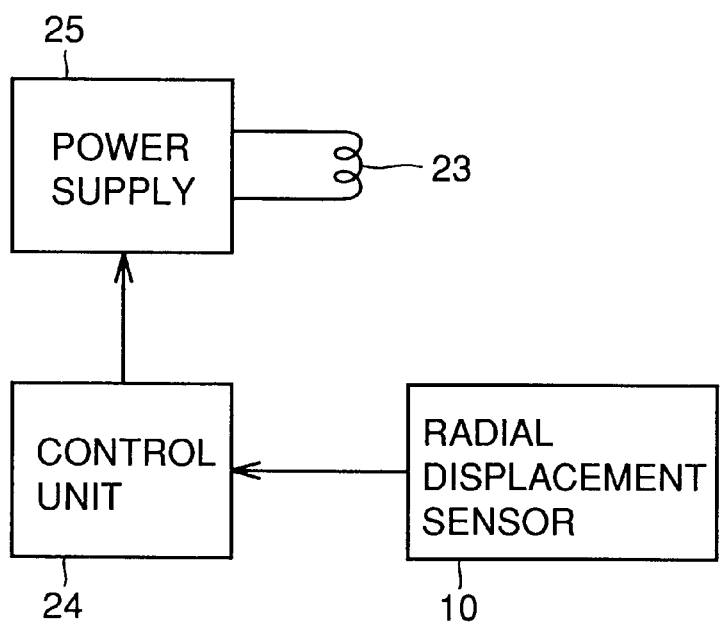
FIG. 3 is a block diagram illustrating a method of controlling the radial electromagnet shown in FIG. 2.
Figure 4:
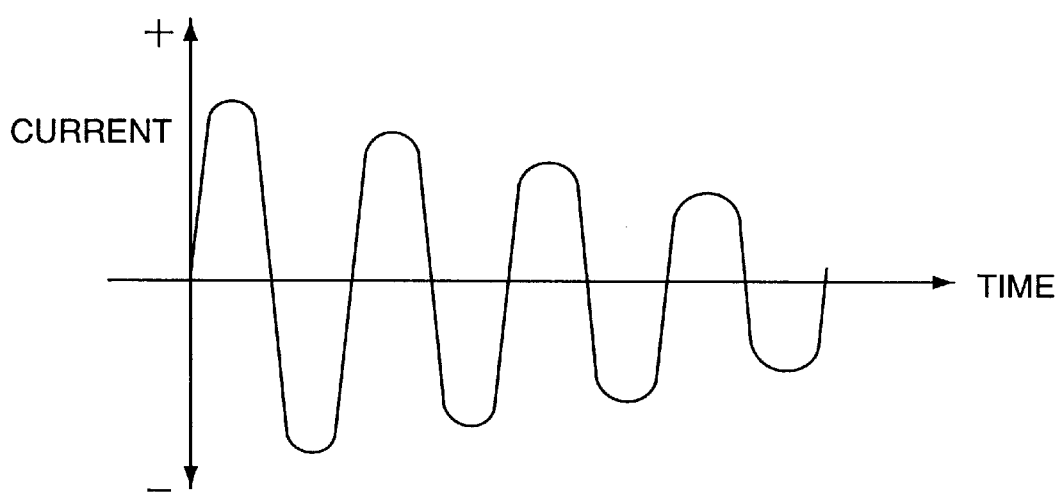
FIG. 4 is a waveform chart illustrating a method of erasing a residual magnetic field of the radial electromagnet shown in FIG. 2.

Coil 23 is connected to an output terminal of a power supply 25 controlled by a control unit 24 as shown in FIG. 3. In the normal operation, control unit 24 controls the current flowing through coil 23 such that the output level of radial displacement sensor 10 has a predetermined level, i.e. rotor 8 is supported at a predetermined position via main shaft 6a with no contact. In addition, control unit 24 applies to coil 23, when cleaning is done, an alternating current having its amplitude attenuating gradually as shown in FIG. 4 to erase a residual magnetic field of electromagnet core 22 and accordingly weaken the adhesive force of dust attaching to electromagnet core 22.

Radial magnetic bearing 12 has the same structure as that of radial magnetic bearing 9 and includes a radial displacement sensor 13 and a radial electromagnet 14, and bearing 12 is similarly controlled to radial magnetic bearing 9.

Figure 5:
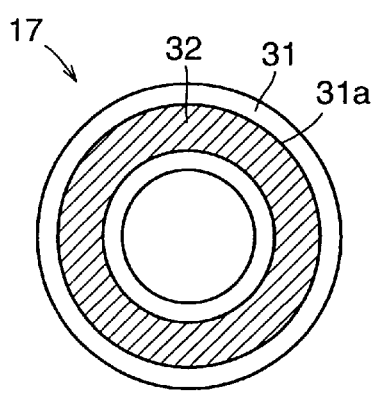
FIG. 5 illustrates a structure of a thrust electromagnet shown in FIG. 1.

Referring to FIG. 1 again, thrust magnetic bearing 15 includes a thrust displacement sensor 16, and thrust electromagnets 17 and 18 which are placed respectively on both sides of thrust plate 7 such that they sandwich plate 7. Thrust displacement sensor 16 is located opposite to one end surface of thrust plate 7 to output a signal of a level according to the distance between a sensing portion of sensor 16 and the one end surface of thrust plate 7. As shown in FIG. 5, thrust electromagnet 17 includes a ring-shaped electromagnet core 31 having a ring-shaped groove 31a formed in one end surface thereof, and a coil 32 fitted in groove 31a. Thrust electromagnet 17 is placed such that a magnetic pole surface on groove 31a is opposite to the one end surface of thrust plate 7. Thrust electromagnet 18 has a similar structure to that of thrust electromagnet 17 and is placed opposite to the other end surface of thrust plate 7.

Figure 6:
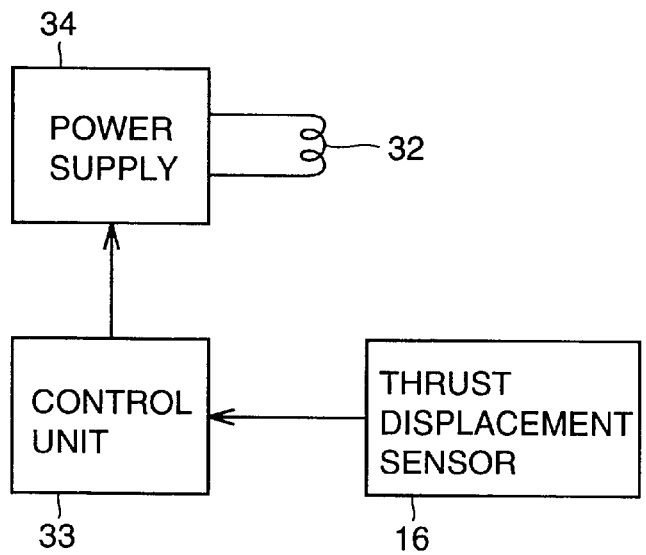
FIG. 6 is a block diagram illustrating a method of controlling the thrust electromagnet shown in FIG. 5.

Referring to FIG. 6, coil 32 is connected to an output terminal of a power supply 34 controlled by a control unit 33. In the normal operation, control unit 33 controls the current flowing through coil 32 such that an output signal of thrust displacement sensor 16 has a predetermined level, i.e. rotor 8 is supported at a predetermined position via thrust plate 7 with no contact. Control unit 33 further applies to coil 32, when cleaning is done, an alternating current with its amplitude attenuating gradually as shown in FIG. 4 so as to erase a residual magnetic field of core 31 and accordingly weaken the adhesive force of dust attaching to core 31.

When fan unit 2 is stopped, rotor 8 is supported by a touchdown member (not shown). Therefore, rotor 8 is never brought into contact with magnetic bearings 9, 12 and 15. When fan unit 2 is operating, rotor 8 is supported by magnetic bearings 9, 12 and 15 with no contact so that rotor 8 is never brought into contact with the touchdown member.

Referring to FIG. 1 again, motor 19 includes a rotor 20 and a stator 21, and rotor 20 is attached to the end of main shaft 6b. When current is applied to motor 19, rotor 8 is driven to rotate via rotor 20 with no contact.

Dust suction openings 1a and 1b are formed opposite to the end surfaces of main shafts 6a and 6b respectively in chamber 1. Respective dust suction openings 1a and 1b lead into dust sucking units 3 and 4. Dust sucking units 3 and 4 suck the dust attaching to electromagnets 11, 14, 17 and 18 together with any gas (air, inactive gas and the like) introduced into chamber 1 at the time of cleaning.

An operation of this excimer laser device is now described. In the normal operation, gas circulation fan unit 2 operates and rotor 8 is supported by magnetic bearings 9, 12 and 15 without contact and driven to rotate by motor 19 without contact. In this way, laser gas in chamber 1 is circulated to be directed to discharge electrodes (not shown) and accordingly the laser gas is excited. A laser beam is emitted when the excited laser gas makes transition to a ground state.

When cleaning is done, gas circulation fan unit 2 is stopped from operating, and rotor 8 is held by a touchdown member 100. The touchdown member 100 includes two rolling bearings 101 respectively on lateral two sides of the fan 5. The distance between the inner surface of the rolling bearings 101 and the outer surface of the main shafts 6a and 6b is smaller than the distance between the inner surface of the radial magnetic bearings 9 and 12 and the outer surface of the main shafts 6a and 6b. Accordingly, the rotor 8 is supported by the touchdown member 100 when the fan unit 2 is stopped, while the rotor 8 is supported by the magnetic bearings 9, 12, and 15 when the fan unit is driven. Control units 24 and 33 and power supplies 25 and 34 cause a gradually attenuating alternating current to flow through the coils 23 and 32 of electromagnets 14, 17 and 18 so as to erase residual magnetic fields of electromagnets 11, 14, 17 and 18 and accordingly weaken the adhesive force of dust attaching to electromagnets 11, 14, 17 and 18.

At the same time, any gas for cleaning is applied into chamber 1 and the gas in chamber 1 is sucked by dust sucking units 3 and 4. The dust attaching to electromagnets 11, 14, 17 and 18 flows with the stream of gas to be sucked into dust sucking units 3 and 4.

In this way, in the excimer laser device, accumulation of dust on electromagnets 11, 14, 17 and 18 of magnetic bearings 9, 12 and 15 is prevented and thus the difficulty in control of magnetic bearings 9, 12 and 15 due to the dust is avoided.

Second Embodiment

Figure 7A:
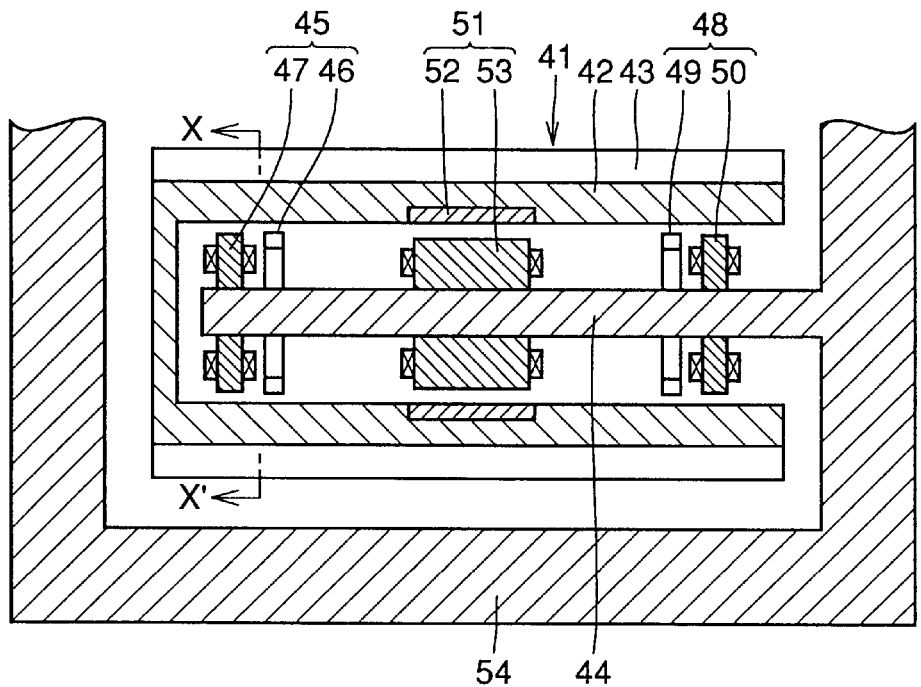
FIGS. 7A and 7B illustrate a structure of a laser gas circulation fan unit of an excimer laser device in a second embodiment of the invention.
Figure 7B:
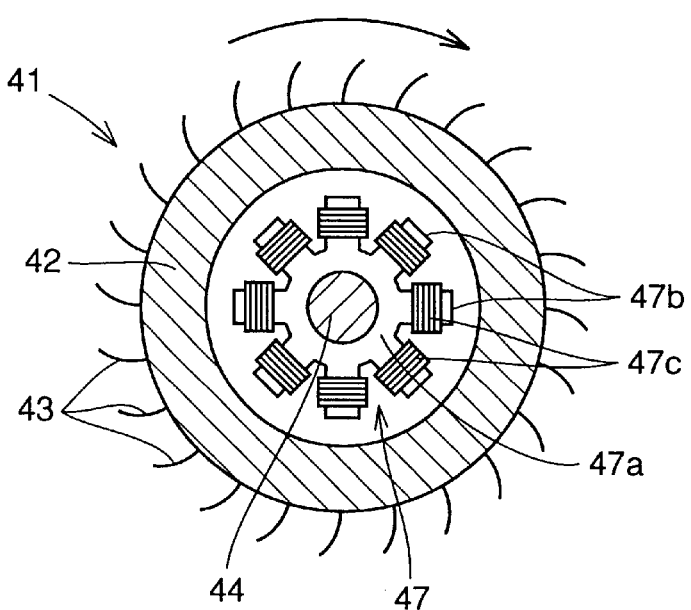

FIG. 7A is a cross sectional view illustrating a structure of a gas circulation fan unit of an excimer laser device in the second embodiment of the invention, and FIG. 7B is a cross sectional view along line X–X' of FIG. 7A.

Referring to FIGS. 7A and 7B, the gas circulation fan unit includes a fan 41, a fixed shaft 44, radial magnetic bearings 45 and 48 and a motor 51 for supporting fan 41 and driving it to rotate without contact.

Fan 41 includes a support member 42 shaped like a water glass having its one end closed, and a plurality of vane members 43 placed to stand on the outer circumferential surface of support member 42 at a predetermined pitch therebetween in the circumferential direction. Support member 42 is formed of a magnetic material (e.g. iron). When fan 41 is driven to rotate, gas in a chamber 54 is circulated by vane members 43 of fan 41.

Fixed shaft 44 is housed inside glass-shaped support member 42 of fan 41 to pass through radial magnetic bearing 48, motor 51 and radial magnetic bearing 45. The proximal end of fixed shaft 44 is fixed to the inside of the wall of chamber 54.

Radial magnetic bearings 45 and 48 are fixed on the distal end and proximal end of fixed shaft 44 respectively. Radial magnetic bearing 45 includes a radial displacement sensor 46 and a radial electromagnet 47. Radial displacement sensor 46 is placed opposite to the inner circumferential surface of glass-shaped support member 42 of fan 41 to output a signal of a level according to the distance between a sensing portion of sensor 46 and the inner circumferential surface of glass-shaped support member 42.

Radial electromagnet 47 includes a ring-shaped support member 47a fitted onto fixed shaft 44, a plurality of (8 in FIG. 7B) electromagnet cores 47b each projecting from the outer circumferential surface of support member 47a toward the inner circumferential surface of glass-shaped support member 42, and a coil 47c wound around each core 47b.

Figure 8:
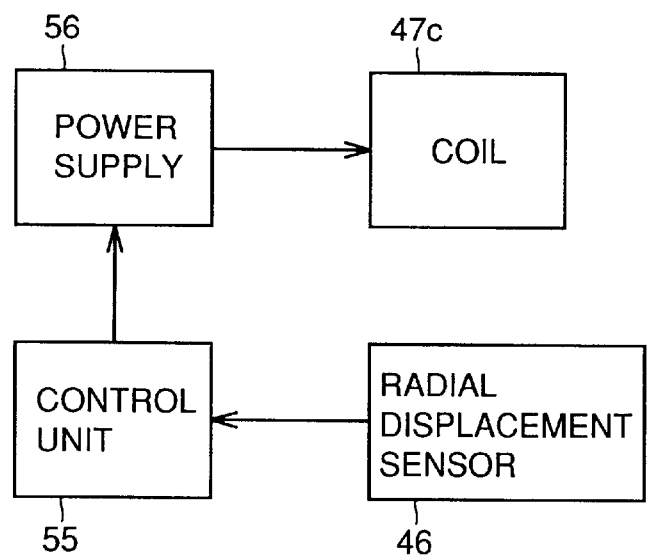
FIG. 8 is a block diagram illustrating a method of controlling a radial magnetic bearing shown in FIG. 1.

Referring to FIG. 8, coil 47c is connected to an output terminal of a power supply 56 which is controlled by a control unit 55. Control unit 55 controls the current flowing through coil 47c such that an output level of radial displacement sensor 46 has a predetermined level, i.e. fan 41 is supported at a predetermined position with no contact. The balanced attraction exerted between the magnetic pole surfaces of eight electromagnet cores 47b and support member 42 of fan 41 provides support to fan 41 without contact.

Radial magnetic bearing 48 includes a radial displacement sensor 49 and a radial electromagnet 50, has a similar structure to that of radial electromagnet bearing 45 and is controlled similarly to radial magnetic bearing 45.

Referring to FIGS. 7A and 7B again, motor 51 includes a rotor 52 and a stator 53. Rotor 52 is formed into a ring shape and fixed at the central portion of the inner circumferential surface of glass-shaped support member 42 of fan 41. Stator 53 is fixed at the central portion of fixed shaft 44 opposite to rotor 52. When an alternating current is applied to a coil of stator 53, a rotational magnetic field is generated so that fan 41 is driven to rotate via rotor 52 without contact.

An operation of this gas circulation fan unit is hereinafter described. When the power supply of the excimer laser device is turned on, the operation of the gas circulation fan unit is started. Fan 41 is supported by radial magnetic bearings 45 and 48 without contact and simultaneously driven to rotate by motor 51 without contact. Then, laser gas within chamber 54 is circulated to be directed to discharge electrodes and accordingly the laser gas is excited. When the excited laser gas makes transition to a ground state, a laser beam is emitted. When the power supply of the excimer laser device is turned off, the rotational driving of fan 41 is stopped.

According to the second embodiment, fan 41 of the gas circulation fan unit is supported by and driven to rotate by radial magnetic bearings 45 and 48 and motor 51 without contact. Therefore, the laser gas is never contaminated by impurity gas and dust generated from the bearings as occurs in the conventional device employing the ball bearing as the bearing of the rotational shaft of the fan. Further, radial magnetic bearings 45 and 48 do not wear as the ball bearing to accomplish easier maintenance of the device.

Fixed shaft 44 is inserted into fan 41 to support the inner circumferential surface of fan 41 without contact. The resultant device size is thus made smaller than the conventional device having rotational shaft 86 projecting on both sides of fan 85.

Figure 9:
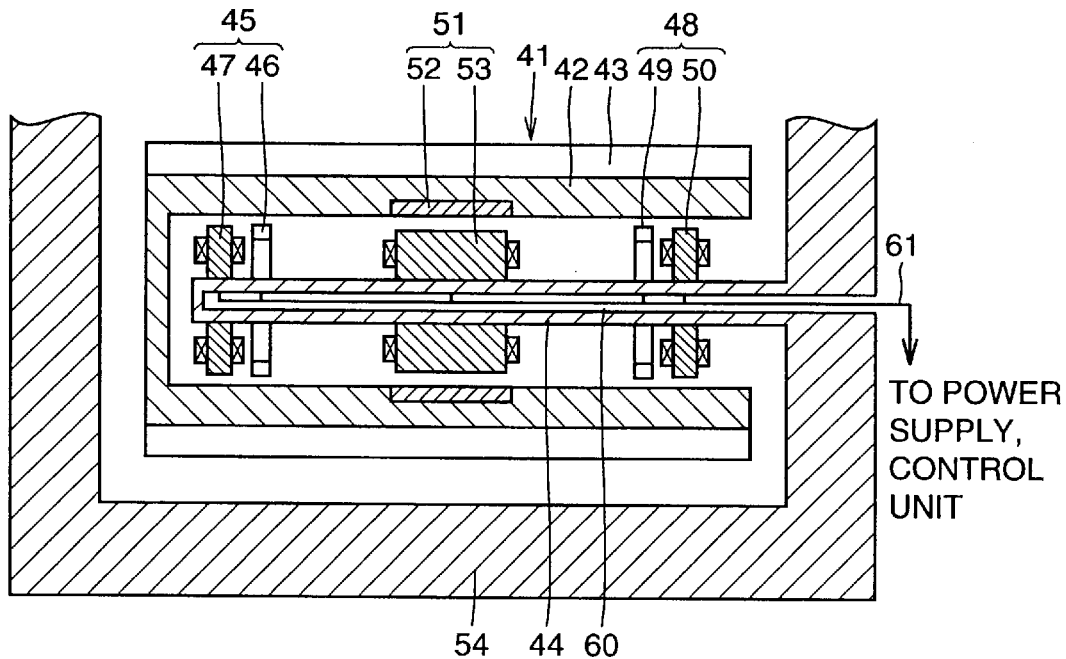
FIG. 9 illustrates a modification of the second embodiment.

Modifications of the second embodiment are hereinafter described. According to a modification shown in FIG. 9, a cable hole 60 is formed from the outer wall of chamber 54 to the distal end of fixed shaft 44. A cable 61 for radial magnetic bearings 45, 48 and stator 53 of motor 51 is drawn out via fixed shaft 44 into hole 60 and further drawn out of chamber 54 via hole 60. In this modification, cable 61 can be separated from laser gas ambient and accordingly it is possible to avoid damage to cable 61 caused by the laser gas and prevent contamination of the laser gas by impurity gas generated from cable 61.

Figure 10:
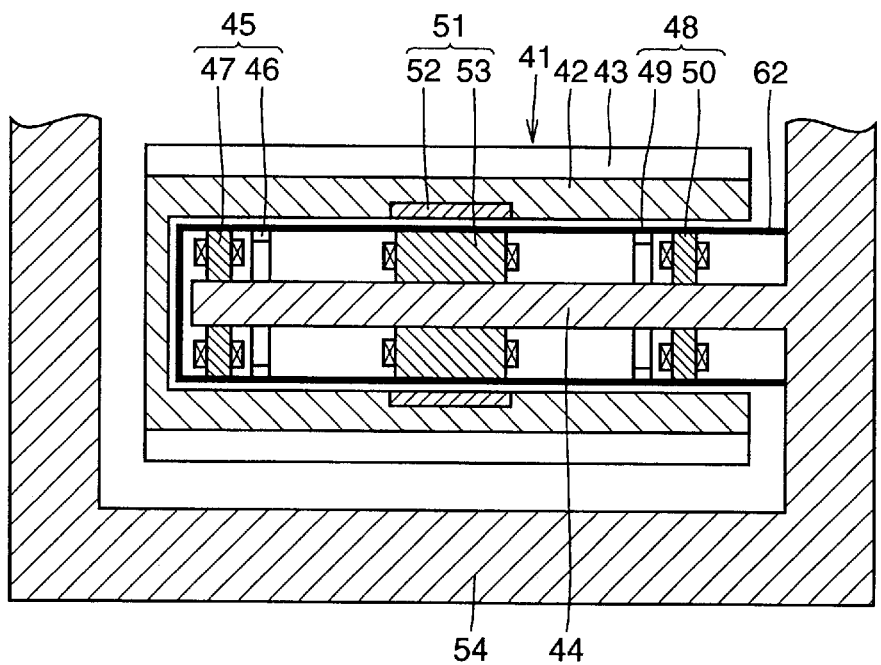
FIG. 10 illustrates another modification of the second embodiment.
Figure 11:
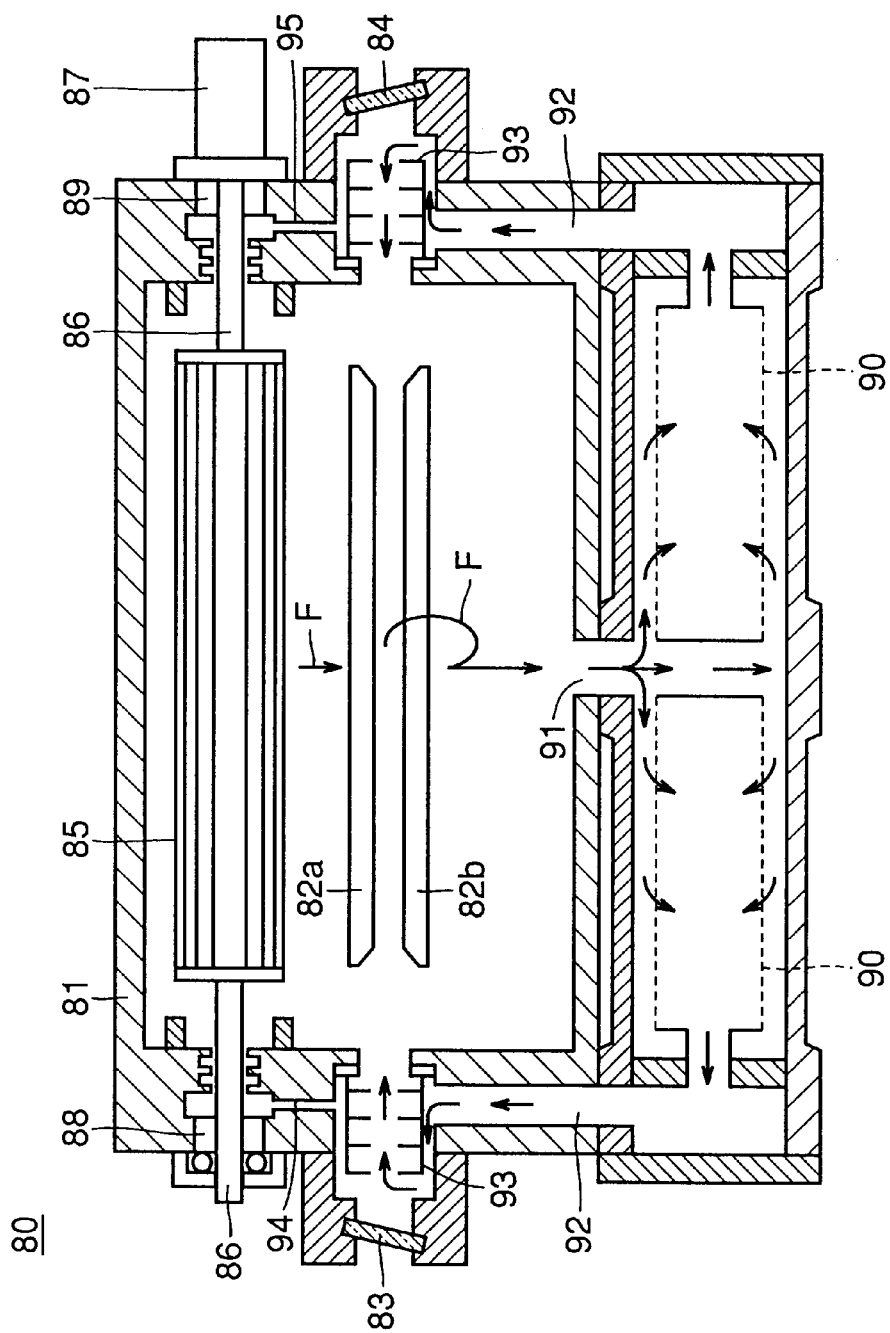
FIG. 11 is a cross sectional view illustrating a structure of a conventional excimer laser device.

According to a modification shown in FIG. 10, a metal cover 62 shaped like a cylinder with its one end closed is provided so as to cover fixed shaft 44, radial magnetic bearings 45 and 48, and stator 53 of motor 51. Metal cover 62 is formed of a thin sheet of metal (such as stainless). According to this modification, metal cover 62 can separate radial magnetic bearings 45 and 48 and stator 53 of motor 51 from laser gas ambient, and accordingly, degradation of various components due to the laser gas as well as mixture of impurity gas generated from the various components into the laser gas can be prevented. In addition, metal cover 62 shields radial displacement sensors 46 and 49. Consequently, it is possible to avoid an undesirable influence on radial displacement sensors 46 and 49 due to noise generated from electrodes upon laser oscillation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An excimer laser device exciting laser gas in a chamber to produce a laser beam, comprising:

a fan placed in said chamber for circulating said laser gas;

a magnetic bearing including an electromagnet for rotatably supporting said fan without contacting said fan; and magnetic field erasing means for applying an alternating current to said electromagnet when said excimer laser device is stopped so as to erase a residual magnetic field of said electromagnet.

2. The excimer laser device according to claim 1, further comprising dust sucking means for sucking to remove dust attaching to said electromagnet when said excimer laser device is stopped.

3. The excimer laser device according to claim 1, wherein said magnetic field erasing means provides a gradually attenuating alternating current to said electromagnet to erase the residual magnetic field of said electromagnet.

4. An excimer laser device exciting laser gas in a chamber to produce a laser beam, comprising:

a fan placed in said chamber and including a cylindrical member and a vane member provided on outer circumferential surface of said cylindrical member for circulating said laser gas;

a fixed shaft inserted into said cylindrical member of said fan and having its one end fixed to inner wall of said chamber;

a magnetic bearing provided at said fixed shaft opposite to inner circumferential surface of said cylindrical member of said fan for supporting said fan without contacting said fan; and driving means for driving to rotate said fan without contacting said fan.

5. The excimer laser device according to claim 4, wherein said magnetic bearing includes:

a radial displacement sensor for detecting a radial position of said fan; and a radial electromagnet having its coil current controlled according to result of detection by said radial displacement sensor for supporting said fan without contacting said fan.

6. The excimer laser device according to claim 4, wherein said driving means includes:

a rotor provided to have a ring shape on inner circumferential surface of said cylindrical member of said fan; and a stator fixed to said fixed shaft opposite to said rotor for generating a rotational magnetic field to drive and rotate said rotor without contacting said rotor.

7. The excimer laser device according to claim 6, wherein a cable hole is formed from outer wall of said chamber into said fixed shaft, and a cable for said magnetic bearing and said stator is drawn out of said chamber via said cable hole.

8. The excimer laser device according to claim 6, further comprising a metal cover for protecting said magnetic bearing and said stator.

* * * * *